US012193907B2

(12) United States Patent
Riley et al.

(10) Patent No.: US 12,193,907 B2
(45) Date of Patent: *Jan. 14, 2025

(54) SYSTEMS AND METHODS INCLUDING PALATAL EXPANDERS WITH ANCHOR INTERFACES

(71) Applicant: Align Technology, Inc., San Jose, CA (US)

(72) Inventors: Jeremy Riley, Mountain View, CA (US); Eric Kuo, San Jose, CA (US); Chunhua Li, Cupertino, CA (US)

(73) Assignee: Align Technology, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/477,513

(22) Filed: Sep. 28, 2023

(65) Prior Publication Data
US 2024/0016581 A1    Jan. 18, 2024

Related U.S. Application Data

(63) Continuation of application No. 17/304,904, filed on Jun. 28, 2021, now Pat. No. 11,826,221, which is a continuation of application No. 16/003,841, filed on Jun. 8, 2018, now Pat. No. 11,045,283.

(60) Provisional application No. 62/517,404, filed on Jun. 9, 2017.

(51) Int. Cl.
*A61C 7/10* (2006.01)
*A61C 7/00* (2006.01)
*A61C 8/00* (2006.01)
*A61C 1/08* (2006.01)

(52) U.S. Cl.
CPC .............. *A61C 7/10* (2013.01); *A61C 7/002* (2013.01); *A61C 8/0096* (2013.01); *A61C 1/084* (2013.01)

(58) Field of Classification Search
CPC ......... A61C 7/10; A61C 7/002; A61C 8/0096; A61C 1/084
See application file for complete search history.

(56) References Cited

U.S. PATENT DOCUMENTS

| | | | |
|---|---|---|---|
| 7,874,836 B2 * | 1/2011 | McSurdy, Jr. | A61C 7/10 433/6 |
| 11,045,283 B2 * | 6/2021 | Riley | A61C 8/0096 |
| 11,219,506 B2 | 1/2022 | Shanjani et al. | |
| 11,259,896 B2 | 3/2022 | Matov et al. | |
| 11,273,011 B2 | 3/2022 | Shanjani et al. | |
| 11,278,375 B2 | 3/2022 | Wang et al. | |
| 11,318,667 B2 | 5/2022 | Mojdeh et al. | |
| 11,331,166 B2 | 5/2022 | Morton et al. | |
| 11,344,385 B2 | 5/2022 | Morton et al. | |
| 11,376,101 B2 | 7/2022 | Sato et al. | |
| 11,419,702 B2 | 8/2022 | Sato et al. | |
| 11,419,710 B2 | 8/2022 | Mason et al. | |
| 11,471,253 B2 | 10/2022 | Venkatasanthanam et al. | |
| 11,497,586 B2 | 11/2022 | Kopelman | |

(Continued)

*Primary Examiner* — Ralph A Lewis
(74) *Attorney, Agent, or Firm* — Shay Glenn LLP

(57) ABSTRACT

A series of a palatal expanders increasing width can be used to gradually expand a patient's palate. Each palatal expander may have a palatal region flanked by teeth regions. The palatal region can have a plurality of anchor-receiving features (e.g., anchor interfaces) that allow the palatal expander to be attached to temporary anchorage device anchors that have been implanted into the patient's maxilla.

21 Claims, 9 Drawing Sheets

(56) References Cited

U.S. PATENT DOCUMENTS

| | | |
|---|---|---|
| 11,504,214 B2 | 11/2022 | Wu et al. |
| 11,523,881 B2 | 12/2022 | Wang et al. |
| 11,534,268 B2 | 12/2022 | Li et al. |
| 11,534,974 B2 | 12/2022 | O'Leary et al. |
| 11,554,000 B2 | 1/2023 | Webber |
| 11,564,777 B2 | 1/2023 | Kopelman et al. |
| 11,571,278 B2 | 2/2023 | Kopelman et al. |
| 11,571,279 B2 | 2/2023 | Wang et al. |
| 11,576,750 B2 | 2/2023 | Kopelman et al. |
| 11,576,752 B2 | 2/2023 | Morton et al. |
| 11,589,955 B2 | 2/2023 | Medvinskaya et al. |
| 11,596,502 B2 | 3/2023 | Webber et al. |
| 11,602,414 B2 | 3/2023 | Sato et al. |
| 11,642,194 B2 | 5/2023 | Boronkay et al. |
| 11,642,198 B2 | 5/2023 | Kopelman et al. |
| 11,666,415 B2 | 6/2023 | Wang et al. |
| 11,701,203 B2 | 7/2023 | Makarenkova et al. |
| 11,737,857 B2 | 8/2023 | Derakhshan et al. |
| 11,779,243 B2 | 10/2023 | Li et al. |
| 11,779,437 B2 | 10/2023 | Cam et al. |
| 11,793,606 B2 | 10/2023 | Cam et al. |
| 11,826,221 B2 * | 11/2023 | Riley ................... A61C 7/10 |
| 2009/0130620 A1 * | 5/2009 | Yazdi ................... A61C 7/10 433/7 |
| 2011/0143300 A1 * | 6/2011 | Villaalba ............... A61C 7/10 433/7 |
| 2016/0278882 A1 * | 9/2016 | Kitching ............... A61C 7/08 |
| 2018/0353264 A1 * | 12/2018 | Riley ................... A61C 7/10 |

* cited by examiner

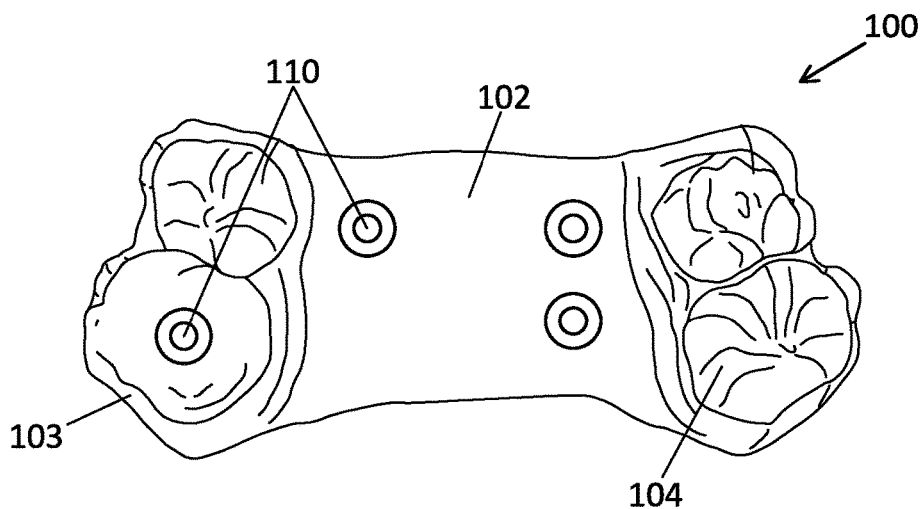
FIG. 1A
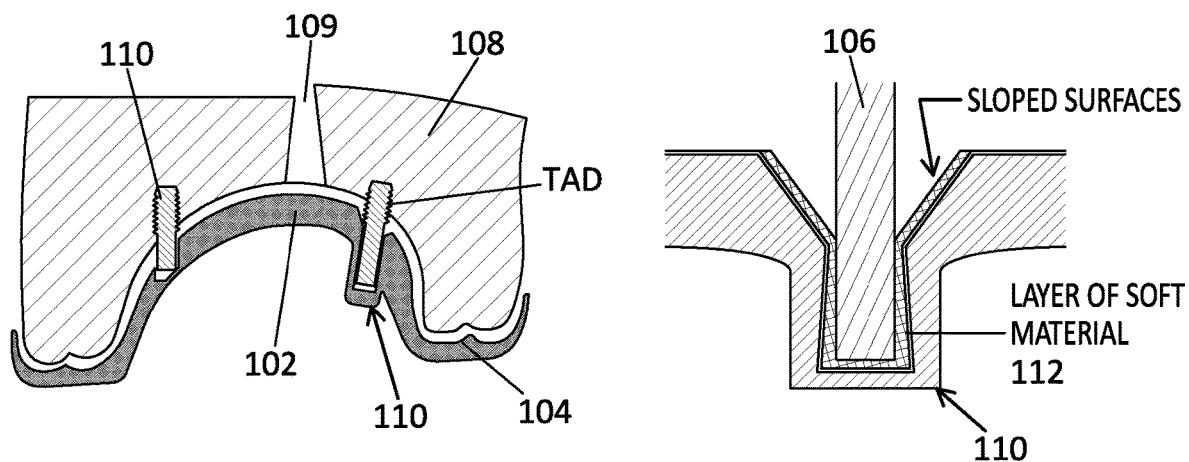
FIG. 1B
FIG. 1C

SYSTEMS AND METHODS INCLUDING PALATAL EXPANDERS WITH ANCHOR INTERFACES

CLAIM OF PRIORITY

The application is a continuation of U.S. patent application Ser. No. 17/304,904, filed on Jun. 28, 2021, titled "SYSTEMS AND METHODS INCLUDING PALATAL EXPANDERS WITH ANCHOR-RECEIVING FEATURES," now U.S. Patent Application Publication No. 2022/0015870, which is a continuation of U.S. patent application Ser. No. 16/003,841, filed on Jun. 8, 2018, titled "PALATAL EXPANDER WITH SKELETAL ANCHORAGE DEVICES," now U.S. Pat. No. 11,045,283, which claims priority to U.S. Provisional Patent Application No. 62/517,404, filed Jun. 9, 2017, titled "PALATAL EXPANDER WITH TEMPORARY ANCHORAGE DEVICES," each of which is herein incorporated by reference in its entirety for all purposes.

INCORPORATION BY REFERENCE

All publications and patent applications mentioned in this specification are herein incorporated by reference to the same extent as if each individual publication or patent application was specifically and individually indicated to be incorporated by reference.

FIELD

Embodiments of the invention relate generally to dental appliances, and more specifically to dental appliances for expanding a patient's palate.

BACKGROUND

Palatal expanders are used to widen the palate of a patient's maxilla. Traditional palatal expanders typically have a metal frame that can be attached to the posterior teeth (molars and premolars) and an expansion screw that can be activated to increase the width of the metal frame. The palatal expander exerts an outward force on the posterior teeth and transmits this force to the surrounding bone in order to expand the maxilla and palate. However, the outward force on the posterior teeth may also cause an unwanted outward tipping of the posterior teeth which serve as the anchors.

As an alternative to tooth-based anchorage, skeletal anchors, which include dental implants and small implants, often referred to as temporary anchorage devices (TADs) can be implanted into the maxilla. Skeletal anchors are sometimes used to help move teeth by providing the dental practitioner additional anchorage locations for reciprocal orthodontic forces which move teeth to be generated on connected teeth. These skeletal anchors avoid the side effects of unwanted tooth movement typically observed when anchor teeth are used instead. By reducing or avoiding side effects that need to be reversed by the clinician, treatment efficiency is increased, and efficacy may also be improved.

Designing a palatal expander that can widen the patient's maxilla and palate with minimal or reduced unwanted movements to the patient's teeth is therefore desirable.

SUMMARY OF THE DISCLOSURE

The present invention relates generally to dental appliances, and more specifically to dental appliances for expanding a patient's palate that include attachment sites for skeletal anchors (i.e, dental implants and/or temporary anchorage devices (TADs)) in the patient's palate. In particular, described herein are palatal expanders having one or more anchor interfaces (e.g., anchor-receiving, TAD receiving, etc.) portions that have an elastic interface therein, as well as methods of using them to expand a patient's palate and methods of forming them.

Any appropriate skeletal anchor may be used with the apparatuses and methods described herein, including a dental implant or a TAD which comprises a screw, post, hook, protrusion, or the like. A dental implant is generally a structure that is attached to the patient's bone for dental restoration purposes, and can also be used for orthodontic anchorage purposes. A TAD is generally a structure that is attached to the patient's bone for purposes of orthodontic anchorage and subsequently removed after use. The TAD may include a head and a body. The head may protrude into the oral cavity slightly, and the body, which may be threaded, is implanted into the bone (e.g., palate). The head may be shaped in a variety of configurations, including rounded, short, long, rectangular, etc. The head may contain features such as hooks and slots in order to accommodate the attachment of wires, springs, and or elastics. In general, the TAD may be biocompatible and sufficiently rigid/strong to support the applied forces as described herein. For example, a TAD may be metallic (e.g., stainless steel, cobalt chromium alloys, titanium, etc.), although the possibility of bioresorbable implants manufactured from polylactides (polylactic acid, PLA), polyglycolides (polyglycolic acid, PGA) and their co-polymer compositions may also exist. The oral appliances described herein, including palatal expanders, may be configured to mate with the head of the TAD. As will be described in greater detail herein, any of the apparatuses described herein may include an anchor interface that includes an elastic interface. Alternatively or additionally, the TAD may include an elastic cover or overlay over all or part of the head so that it is held between the TAD and the anchor interface of the apparatus.

Although the oral appliances for use with skeletal anchors described herein are primarily palatal expanders, the methods and features (including, for example, elastic anchor-receiving interfaces) may be incorporated as part of any oral appliance for use with a bone anchor, including dental anchorage implants and the like.

An anchor interface generally includes a proximal opening in the apparatus, such as an opening into the oral appliance such as a palatal expander (e.g., into and/or through the palatal region), in to which the anchor may be inserted. The opening may be adapted to help receive and center the anchor in the anchor interface. The anchor interface (e.g., anchor-receiving portion) may also include a distal channel portion that is continuous with the proximal opening. The anchor interface may pass completely through the oral appliance such as the palatal expander, or it may just project into the apparatus, so that the bottom of the anchor interface is closed. As will be described in greater detail here, the body and/or the opening of the anchor interface may be adapted to include an elastic interface. The elastic interface may be a layer, coating, cover, sleeve, or the like on and/or within the anchor interface which may be forced against the anchor when the apparatus is in use in the patient's oral cavity. In general, the elastic interface may be more compressible than the body of the apparatus in which the anchor interface is formed. For example, the body of the apparatus (e.g., palatal expander) may be somewhat rigid so that it may apply a reaction force against the anchors and/or teeth to expand the user's palate. The elastic interface within the anchor interface may therefore be more elastic, and be more compressible than the body of the apparatus. The material of the elastic portion can be selected to deliver a specific amount of force generated per unit of compression/activation. The material of the elastic portion can also be selected to deliver a specific range or distance of activation within a certain force level. By including an elastic (or more compressible) region between the anchor and the anchor interface of the apparatus, the anchor may be more easily inserted into the apparatus and the apparatus may be much more comfortably worn, without compromising the efficacy of the apparatus.

The anchor interface may have any cross-sectional profile, including round, elliptical, polygonal (e.g., triangular, rectangular, square, pentagonal, hexagonal, heptagonal, octagonal, T-shaped, I-shaped, etc.). The cross-sectional profile may match the profile of the anchor that extends from the patient's maxilla (including the head and/or shaft of the anchor). This may include attachments connected to the anchor portion embedded into the bone (e.g., an implant abutment connected to a dental implant). The anchor interface may be straight or angled relative to the plane of the adjacent palatal region. Each anchor interface typically engages with a single anchor extending from the patient's maxilla.

For example, described herein are apparatuses (devices and/or systems) for expanding a patient's palate. Any of these apparatuses may be configured as a palatal expander, and may include: a palatal region configured to be placed adjacent the patient's palate, wherein the palatal region is sized and shaped to exert an outward, lateral force that expands the patient's palate, at least two anchor interfaces located on opposing lateral sides of the palatal region, the anchor interfaces configured to receive anchors (e.g., TADs) implanted in the patient's maxilla such that the outward, lateral forces exerted by the palatal region are transmitted through the anchors to the patient's maxilla. Any of these apparatuses may include an elastic interface on all or a part of each of the anchor interfaces. The elastic interface may have a greater elasticity than the palatal region such that an anchor will displace the elastic interface more than the palatal region when the anchor is received in the anchor interfaces. As used herein the palatal region may be configured to be adjacent to the patient's palate without touching it, so that a small gap or separation (e.g., 0.5 mm, 1 mm, etc.) between the expander and the palate.

Any of the apparatuses described herein may also be configured as a system or series of removable appliances, which can also include aligners. For example, described herein are systems for expanding a patient's palate that includes: a series of palatal expanders, wherein each palatal expander comprises: a palatal region configured to be placed adjacent the patient's palate, wherein the palatal region is sized and shaped to exert an outward, lateral force that expands the patient's palate; at least two anchor interfaces configured to receive anchors implanted in the patient's maxilla such that the outward, lateral forces exerted by the palatal region are transmitted through the anchors to the patient's maxilla. Each of the anchor interface may have an elastic interface therein, wherein the elastic interface has a greater elasticity than the palatal region such that an anchor will displace the elastic interface more than the palatal region when the anchor is received in the anchor interfaces. The two (or more) anchor interfaces may be located on opposing lateral sides of the palatal region.

As mentioned, in any of these apparatuses, the anchors may be temporary anchorage devices (TADs). The palatal region may be based on a manual or digital impression of the patient's palate. The anchors may also be implant devices that are not temporary, such as those used for restorative purposes.

Any of these apparatuses may include an anchor template having at least two anchor guides for guiding implantation of the anchors into the patient's maxilla, wherein the anchor guides are positioned on the anchor template such that the anchors are implanted into the patient's maxilla in locations that correspond to the anchor interfaces of at least one of the palatal expanders (e.g., the first palatal expander in a series) when the palatal expander is worn by the patient.

In any of the apparatuses described herein, the anchor interfaces may have a sloped surface configured to facilitate insertion of the anchors into the anchor interfaces. This sloped surface may be on the proximal opening of the anchor interface. The sloped surface may extend around the entire perimeter of the anchor interface opening, or it may extend only partially around the outer perimeter of the anchor interface, and particularly around the face that is closest to the midline of the apparatus, which may align with the midline of the palate when worn.

As mentioned, the elastic interface may comprise a compressible material. This compressible material may be a polymeric material. The compressible material may be a rubber, silicone, or other material. The elastic interface may be lubricious, and/or a separate lubricious coating may be included. For example, the proximal opening of the anchor interface may be lubricious in addition to being sloped.

In any of the methods and apparatuses described herein, the compressible material may be a spring or clip (e.g., metal clip) that may act as a force generator instead of, or in addition to, an elastic material. For example, a clip may be used as a spring, wherein the clip may be stainless steel, or nickel titanium alloy, or copper nickel titanium alloy, which may have a more consistent (flat) force to deflection curve.

The thickness of the compressible material may be between about 0.1 mm to 2.0 mm. (e.g., between 0.2 mm and 1.5 mm, between 0.2 mm and 1.3 mm, between 0.2 mm and 1.2 mm, between 0.2 mm and 1.0 mm, between 0.2 mm and 0.9 mm, etc.).

Each apparatus (e.g., palatal expander) may include two or more anchor interfaces. For example, each apparatus may include at least three anchor interfaces, at least four anchor interfaces, etc.

The palatal region of the apparatus may generally be configured to be placed against the patient's palate when the anchors are inserted into the anchor interfaces.

At least a portion of the palatal region may be configured to be spaced apart from the patient's palate when the anchors are inserted into the anchor interfaces. The palatal expanders described herein may be fabricated from a rigid or semi-elastic material. Any of the apparatuses described herein may be configured as a palatal expander comprising a teeth region configured to be placed over a portion of the patient's teeth. The teeth region may be configured to be placed over the lingual surfaces of the patient's teeth. Alternatively or additionally, the teeth region may be configured to be placed over the occlusal surfaces of the patient's teeth. Alternatively or additionally, the teeth region may be configured to be placed over the buccal surfaces of the patient's teeth.

A palatal expander for expanding a patient's palate may include: a palatal region configured to be placed adjacent the patient's palate, wherein the palatal region is sized and shaped to exert an outward, lateral force to expand the patient's palate by a predetermined amount; at least two anchor interfaces located on the palatal region; and wherein each of the anchor interfaces has an elastic interface therein, wherein the elastic interface has a greater elasticity than the palatal region and is configured to compress at least about 10 percent (e.g., 10 percent or more, 20 percent or more 25 percent or more, 30 percent or more, 40 percent or more 50 percent or more, etc.) of the predetermined amount.

Also described herein are methods of using any of the apparatuses described herein. For example, described herein are methods of using the apparatuses described herein to expand a patient's palate. These methods may include: placing a palatal expander adjacent the patient's palate, wherein the palatal expander comprises a body and at least two anchor interfaces in the body; inserting a pair of anchors (which may be located on opposing lateral sides of the patient's palate) embedded in the patient's palate into the at least two anchor interfaces of the palatal expander; and compressing an elastic interface within each of the anchor interfaces more than the body, such that the implanted anchors are inserted into the anchor interfaces of the palatal expander. Any of these methods may also include obtaining a palatal expander modeled on the patient's palate.

Any of these methods may also include removing the palatal expander after a period of time has elapsed and inserting placing a second palatal expander adjacent to the patient's palate and inserting the pair of anchors into at least two anchor interfaces of the second palatal expander. The second palatal expander may be wider than the first palatal expander.

Also described herein are methods of forming a series of palatal expanders for expanding a patient's palate, the method comprising: obtaining a manual or digital impression of the patient's palate; fabricating a series of palatal expanders based on the impression of the patient's palate, wherein each palatal expander comprises a body and at least two anchor interfaces formed in the body; and positioning an elastic interface within at least two anchor interfaces, wherein the elastic interface has material compliance that is greater than a material compliance of the body of the palatal expander.

Also described herein are systems. For example, a system may be configured as a system for expanding a patient's palate through a plurality of incremental stages of palatal expansion. The system may include: a plurality of palatal expanders, each palatal expander of the plurality of palatal expanders configured to expand the patient's palate comprising: a palatal region configured to mate with the patient's palate at one incremental stage of the plurality of incremental stages of palatal expansion, and to exert an outward, lateral force on the patient's palate during the one incremental stage of palatal expansion; and at least two anchor interfaces, each anchor interface configured to receive an anchor extending from a maxilla of the patient therein, and to direct at least a portion of the outward, lateral force to the maxilla through the anchors to facilitate skeletal expansion of the maxilla during the one incremental stage of palatal expansion.

In some implementations, each of the at least two anchor interfaces of the palatal expanders of each of the plurality of palatal expanders has an elastic interface therein, wherein the elastic interface has a greater elasticity than the palatal region such that an anchor will displace the elastic interface more than the palatal region when the anchor is received in the anchor interfaces. In some implementations, the elastic interface comprises a compressible material. The compressible material may have an uncompressed thickness of between about 0.2 mm to 1.5 mm.

In some implementations, the palatal region of the each of the palatal expanders has a first rigidity; and the each palatal expander of the plurality of palatal expanders has a soft portion having a second rigidity less than the first rigidity, the second rigidity configured to grip (e.g., facilitate a gripping force) and couple the plurality of anchors to the each palatal expander of the plurality of palatal expanders.

In some implementations, the at least two anchor interfaces are located on opposing lateral sides of the palatal region. The plurality of anchors may be a plurality of temporary anchorage devices. The at least two anchor interfaces of the each palatal expander of the plurality of palatal expanders may be integrally formed with the each palatal expander of the plurality of palatal expanders.

In some implementations, the at least two anchor interfaces of each palatal expander of the plurality of palatal expanders are directly fabricated with each palatal expander of the plurality of palatal expanders. In some implementations, an anchor template may have at least two anchor guides for guiding implantation of the plurality of anchors into the maxilla, wherein the at least two anchor guides are positioned on the anchor template such that the plurality of anchors are inserted into the maxilla in anchor locations that correspond to the anchor interfaces of each palatal expander of the plurality of palatal expanders.

In some implementations, the plurality of anchor interfaces have a sloped surface configured to facilitate insertion of the at least two anchors into the plurality of anchor interfaces. Each palatal expander of the plurality of palatal expanders may comprise at least four anchor interfaces. The palatal region may be configured to be placed against the patient's palate when the at least two anchors are inserted into the plurality of anchor interfaces.

In some implementations, at least a portion of the palatal region is configured to be spaced apart from the patient's palate when the anchors are inserted into the anchor interfaces. The plurality of palatal expanders may be fabricated from a rigid or semi-elastic material. Each palatal expander of the plurality of palatal expanders may comprise a teeth region configured to be placed over a portion of the patient's teeth. In some implementations, the teeth region is configured to be placed over one or more of the lingual surfaces of the patient's teeth, the occlusal surfaces of the patient's teeth, and the buccal surfaces of the patient's teeth.

A system for expanding a patient's palate may comprise: a series of palatal expanders, wherein each palatal expander comprises: a palatal region, wherein the palatal region is sized and shaped to exert an outward, lateral force that expands the patient's palate; at least two anchor interfaces located on opposing lateral sides of the palatal region, the anchor interfaces configured to receive anchors implanted in the patient's maxilla such that the outward, lateral forces exerted by the palatal region are transmitted through the anchors to the patient's maxilla; and wherein each of the anchor interfaces has an elastic interface therein, wherein the elastic interface has a greater elasticity than the palatal region such that an anchor will displace the elastic interface more than the palatal region when the anchor is received in the anchor interfaces.

In some variations, a system (including a system for expanding a patient's palate through a plurality of incremental stages of palatal expansion) may comprise: a plurality of incremental palatal expanders, each palatal expander of the plurality of palatal expanders comprising: a palatal region configured to mate with a palate of a patient at one of the plurality of incremental stages of palatal expansion, and to exert an outward, lateral force on the palate during the one incremental stage of palatal expansion; and means for receiving a plurality of anchors inserted in a maxilla of the patient, and when the plurality of anchors are received, for directing at least a portion of the outward, lateral forces to the maxilla through the plurality of anchors, thereby facilitating skeletal expansion of the maxilla during the one incremental stage of palatal expansion.

A method for expanding a patient's palate may comprise: placing a palatal expander adjacent the patient's palate, wherein the palatal expander comprises a body and at least two anchor interfaces in the body; inserting a pair of anchors embedded in the patient's palate into the at least two anchor interfaces of the palatal expander; and compressing an elastic interface within each of the anchor interfaces more than the body, such that the implanted anchors are inserted into the anchor interfaces of the palatal expander.

A method for expanding a patient's palate may comprise: placing a palatal expander adjacent the patient's palate, wherein the palatal expander comprises a body and at least two anchor interfaces in the body; inserting at least one anchor of the at least two anchor interfaces of the palatal expander embedded into the patient's maxilla; and compressing an elastic interface within each of the anchor interfaces more than the body, such that the implanted anchors are inserted into the anchor interfaces of the palatal expander. In some embodiments, the implant placed into the patient's maxilla can be a regular dental implant, while the implant placed in the palate may be a TAD or regular implant. In some embodiments, the implants are placed in the maxillary ridge. In some embodiments, two implants can be placed on opposing sides of the maxilla/maxillary ridge.

In some implementations, the pair of anchors are embedded on opposing lateral sides of the patient's palate. The method may further comprise removing the palatal expander after a period of time has elapsed and inserting placing a second palatal expander adjacent to the patient's palate and inserting the pair of anchors into at least two anchor interfaces of the second palatal expander. In some implementations, the second palatal expander is wider than the first palatal expander.

A method for palatal expansion may comprise: gathering a palatal expander, the palatal expander comprising: a palatal region configured to mate with a palate of a patient at an incremental stage of palatal expansion; and a plurality of anchor interfaces configured to receive a plurality of anchors configured to be inserted in a maxilla of a patient; coupling the palatal region to the palate of the patient to exert an outward, lateral force on the palate during the incremental stage of the palatal expansion; and coupling the plurality of anchor interfaces to the plurality of anchors to direct at least a portion of the outward, lateral force to the maxilla through the plurality of anchors, thereby facilitating skeletal expansion of the maxilla during the incremental stage of palatal expansion.

In some implementations, the method may include inserting the plurality of anchors into the maxilla through a plurality of openings corresponding to the plurality of anchor interfaces. In some implementations, the incremental stage is a first stage, an intermediate stage, or a final stage of the palatal expansion.

A computer-implemented method of forming a plurality of incremental palatal expanders may comprise: gathering a plurality of representations of a palate of a patient at a plurality of stages of palatal expansion in accordance with a palatal expansion plan; identifying in each of the plurality of representations of the palate a stage-specific plurality of anchor locations for the corresponding stage of palatal expansion, the stage-specific plurality of anchor locations being associated with locations of a plurality of anchors to be inserted into a maxilla of the patient at the corresponding stage of palatal expansion; virtually representing a plurality of incremental palatal expanders for the plurality of stages of palatal expansion, each of the plurality of incremental palatal expanders having a palatal region and a plurality of stage-specific anchor interfaces at the stage-specific plurality of anchor locations, the stage-specific anchor interfaces configured to receive the plurality of anchors; and providing instructions to fabricate the plurality of incremental palatal expanders for the plurality of stages of palatal expansion using the plurality of virtual representations of the plurality of incremental palatal expanders.

In some implementations, the plurality of stage-specific anchor interfaces are configured to direct at least a portion of the outward, lateral force to the maxilla through the plurality of anchors. The instructions to fabricate may comprise instructions to directly fabricate the plurality of incremental palatal expanders. The stage-specific plurality of anchor locations may comprise one or more pairs of anchor locations, the anchor locations in each pair having a substantially equidistant distance from a midline of the palate.

In some implementations, the substantially equidistant distance of the each pair of anchor locations at an earlier stage of palatal expansion of the plurality of stages of palatal expansion is smaller than the substantially equidistant distance of the each pair of anchor locations at a later stage of palatal expansion of the plurality of stages of palatal expansion.

In some implementations, the palatal region of the each palatal expander of the plurality of palatal expanders has a first rigidity; and the each palatal expander of the plurality of palatal expanders has a soft portion having a second rigidity less than the first rigidity, the second rigidity configured to facilitate a gripping force to couple the plurality of anchors to the each palatal expander of the plurality of palatal expanders.

In some implementations, the soft portion resides inside at least a portion of the plurality of stage-specific anchor interfaces. The soft portion may reside inside a portion of the palatal region.

A method of forming a series of palatal expanders for expanding a patient's palate may comprise: obtaining a manual or digital impression of the patient's palate; fabricating a series of palatal expanders based on the impression of the patient's palate, wherein each palatal expander comprises a body and at least two anchor interfaces formed in the body; and positioning an elastic interface within at least two anchor interfaces, wherein the elastic interface has material compliance that is greater than a material compliance of the body of the palatal expander.

BRIEF DESCRIPTION OF THE DRAWINGS

The novel features of the invention are set forth with particularity in the claims that follow. A better understanding of the features and advantages of the present invention will be obtained by reference to the following detailed description that sets forth illustrative embodiments, in which the principles of the invention are utilized, and the accompanying drawings of which:

FIG. 1A illustrates a palatal expander as described herein.

FIG. 1B illustrates a cross-sectional view of a palatal expander that has been placed against the palate.

FIG. 1C illustrates a close-up view of temporary anchorage device anchor inserted into an anchor interface of the palatal expander.

FIG. 4A shows a TAD interface portion comprising an opening into the body of the palatal expander having a beveled (e.g., ramped) edge on the inward-facing side of the opening. FIG. 4B shows an example of a TAD interface portion of a palatal expander having a beveled edge around the entire opening; in this example the TAD interface includes a more compliant surface (e.g., an elastic material) lining at least a part of the opening and TAD interface portion.

In FIG. 4C, the interface forms an opening through the body of the palatal expander; the opening region into the interface is beveled or ramped (alternatively just one portion, such as the side facing the midline of the palatal expander, may be ramped or beveled). FIG. 4D shows an interface for a TAD in which the inner wall comprises a compliant material (e.g., a material having a higher compliance/elasticity than the body of the palatal expander. This region of complaint material may be a coating or layer and/or may cover the entire interface, including the proximal opening region and/or the more distal inner channel region, or just a portion of the interface. For example, FIG. 4E shows a variation in which only the proximal opening region (shown here as a ramped or beveled region) includes a compliant material. In FIG. 4F, only the portion of the interface, such as the portion that is nearest to the midline of the palatal expander body, which will apply force against the anchor, includes the more compliant surface(s). In FIG. 4G the more distal inner channel region includes a more compliant surface (but not the proximal opening region, shown here as ramped). In FIG. 4H, only a portion of the distal inner channel region includes a more compliant surface, such as the portion that is nearest to the midline of the palatal expander body, which will apply force against the anchor.

DETAILED DESCRIPTION

Described herein are oral apparatuses that may be used with a skeletal anchorage device that is attached in a patient's bone, such as the patient's palate. Any of these apparatuses may include an anchor interface that includes or is adapted for use with an elastic interface, which may be an interface surface, sleeve, coating, layer, etc., that is interposed between the anchor interface (e.g., anchor-receiving portion) and an anchor (e.g. temporary anchorage device (TAD), dental implant) inserted into the anchor interfaces. The elastic interface may be configured to compress when the apparatus applies force against the anchor to move the palate and/or teeth. Also described herein apparatuses and methods of using and making them that are adapted to permit easier removal and secure application of an anchor in an anchor interface.

A TAD may be substantially smaller than a typical dental implant. In some embodiments, the TAD has a length of less than about 10 mm and a diameter of less than about 2 mm. In some embodiments, the TAD has a length of between about 3 and about 12 mm (e.g., has a length of about 5, 6, 7, 8, 9, or 10 mm) and a diameter of between about 0.9 and 2.1 mm (e.g., about 1.0, 1.1, 1.2, 1.3, 1.4, 1.5, 1.6, 1.7, 1.8, 1.9, and 2.0 mm). In contrast, regular dental implants are typically over 10 mm in length and 3-5 mm in diameter. Because the TAD is much smaller than a traditional screw type implant, the placement procedure is less complicated, loading can be more immediate, and the patient recovery time is quicker.

In particular, the anchors may be configured to support a palatal expander. Palatal expanders can be used with anchors that allow the palatal expander to apply the expansion load directly to the patient's bone, (e.g., the maxilla), instead of to the posterior teeth. The palatal expander can have sockets, receptacles, or some other receiving features that can couple with and/or receive one end of a bone anchor (e.g., TAD or implant).

Figure 1D:
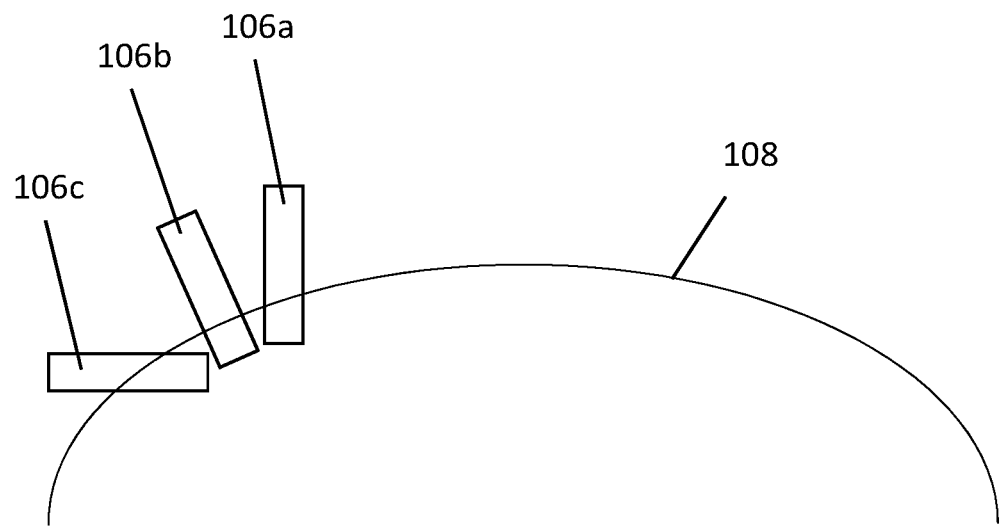
FIG. 1D illustrates various orientations of the implanted temporary anchorage device anchor in the maxilla.
Figure 1E:
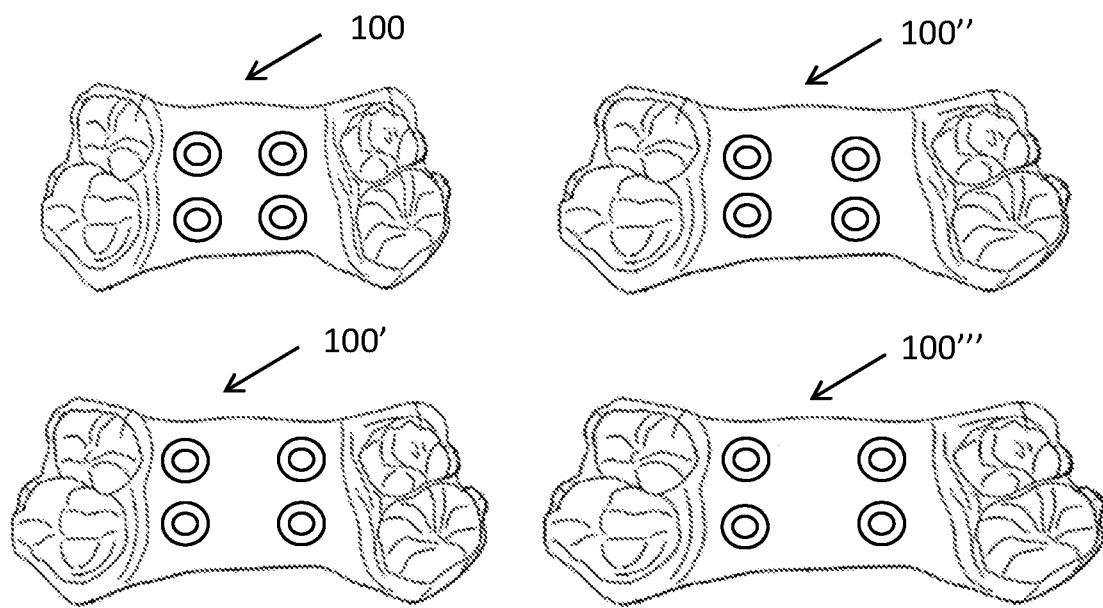
FIG. 1E illustrates an embodiment of a series of palatal expanders for progressively expanding a patient's palate as described herein.

In one embodiment as shown in FIGS. 1A-1E, a series of incremental palatal expanders 100 can be used to gradually expand and widen the patient's maxilla 108 and palate, typically by causing separation and/or expansion of the suture 109 of the maxilla 108. Only one palatal expander 100 is shown in FIG. 1A, but the other palatal expanders 100', 100", 100''' share a similar shape, with the primary difference being the width of the palatal region 102 as shown in FIG. 1E. Each palatal expander 100 can have a palatal region 102 shaped and sized to be placed against or adjacent to a portion of the patient's palate, such as the posterior portion of the patient's palate. The palatal expander 100 may also have one or more teeth receiving portions 104 surrounding the palatal region 102. The teeth receiving portion 104 may be sized and shaped to receive or fit against the lingual surfaces of the teeth, and optionally against the occlusive and lingual surfaces. The width of the palatal region 102 can be oversized relative to the width of the patient's palate so that when the palatal expander is worn, it exerts an outward, lateral force that expands the patient's palate. In some embodiments, the lateral expansionary force can be between about 5 to 50 Newtons. The width of the palatal region can increase with each successive palatal expander in the series.

The shape and size of the palatal region 102 may be based on an analog (e.g., alginate or polyvinyl silicone dental material) or digital impression of the patient's palate. In some embodiments, the palatal region 102 is designed to contact the palate, while in other embodiments, the palatal region 102 is offset a set or predetermined distance from portions of the palate. A refractory model of the palate and the upper teeth can be formed from the analog or digital impression, and a polymer material can be used to fabricate the palatal expander using the model. Alternatively, the palatal expander can be formed using direct fabrication processes, such as 3-D printing for example, based on the digital set-up of the palate and teeth. The material used to fabricate the body of the palatal expander may be rigid, semi-rigid, or semi-elastic. Use of a semi-rigid or semi-elastic material can provide the palatal expander with a degree of flexibility that can lower the force delivered to the maxilla.

In a traditional palatal expander, much of the lateral force is applied to the patient's posterior teeth, typically the distal molars. In order to offload at least some of the force from the patient's teeth, anchors 106 can be implanted into the patient's maxilla 108 as shown in FIG. 1B. At least one anchor 106 can be inserted into each lateral side of the maxilla 108. Additional anchors, such as two, three, or four or more anchors can be implanted in each side in order to disperse the outward force more evenly over a larger portion of the maxilla. The anchors 106 can be implanted into the maxilla 108 in various orientations and configurations. For example, as shown in FIG. 1D, the anchors 106a can be implanted to be oriented in a superior to inferior orientation, or the anchors 106b can be implanted normal to the bone surface, or the anchors 106c can be implanted in a medial to lateral orientation in alignment with the direction of the outward expansionary force. In some embodiments, the anchors can be inserted in an intermediate orientation between the medial to lateral orientation and the normal orientation or between the normal orientation and the superior to inferior orientation. The portion of the anchor that extends out of the palate can terminate in a head with a socket that can be used to drive the into the palate. The socket can have a variety of shapes, such as rectangular, key, star, hex, slot, cross, and the like. A screwdriver with a complementary shaped head can be used to drive the anchor into the palate.

To secure the palatal expander 100 to the anchors 106, as shown in FIGS. 1A-1C, the palatal region 102 can have anchor interfaces 110 located on opposing lateral sides of the palatal region 102 and/or the maxillary region 103. The anchor interfaces 110 can be sockets, receptacles, cavities, recesses, buckets, holes, or other receiving features that are configured to removably receive the portion of the implanted anchors 106 that extend out of the patient's palate after implantation. When the implanted anchors 106 are seated in the anchor interface 110, the outward, lateral forces exerted by the palatal region 102 are transmitted through the anchors 106 to the patient's maxilla 108.

In some embodiments, each of the anchor interfaces 110 may have a liner 112. The liner 112 may be made of a flexible, elastic and/or compressible material to form a flexible, elastic and/or compressible interface within the anchor interface 110. The liner 112 may have a greater flexibility, elasticity and/or compressibility than the palatal region 102 such that the anchor 106 will displace the liner 112 more than the palatal region 102 when the anchor 106 is received in the anchor interface 110. The liner 112 can be provided as a coating or insert. For example, the liner 112 can be an O-ring insert, a tube-like insert or a cup-like insert. In some embodiments, the liner 112 can be 3-D printed or otherwise fabricated or integrated into the anchor interfaces 110 rather than being an insert. The combination of the liner 112 with the receptacle can form a connection plug that can be snapped over the end of the anchor. As shown in FIG. 1C, the anchor interfaces 110 can also have a sloped surface 114 and/or curved surface at the opening to facilitate insertion of the anchors 106 into the anchor interfaces 110. In addition, the head of the anchor can be tapered to also facilitate insertion into the anchor interfaces 110. The anchor interfaces 110 can extend through the full thickness of the palatal region 102 or partially through the thickness of the palatal region 102.

Figure 2:
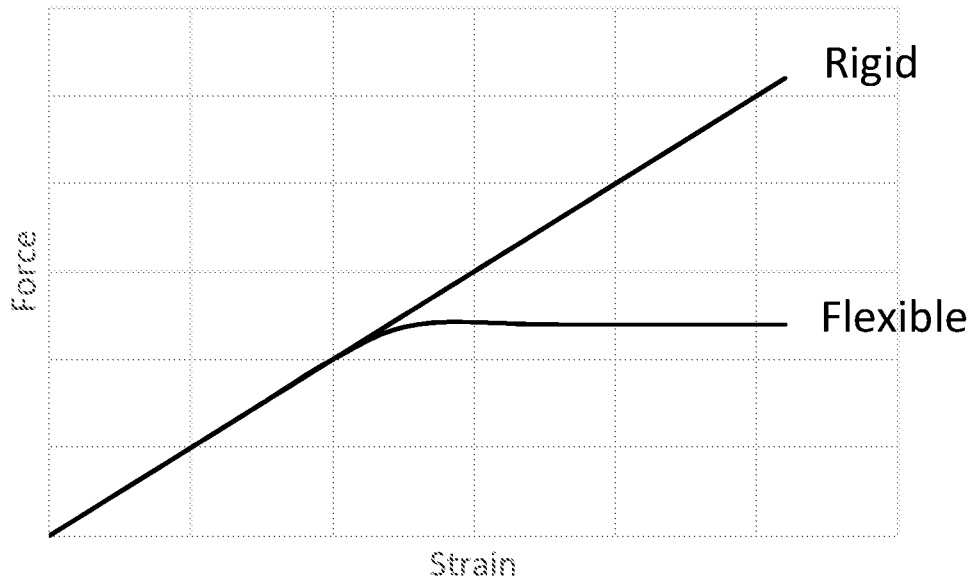
FIG. 2 illustrates the differences in the force curves for a palatal expander made of a rigid material and a palatal expander incorporating a flexible, elastic, and/or compressible material.

As shown in FIG. 2, the use of the flexible, elastic and/or compressible liner 112 allows the palatal expander 100 to apply a more constant level of force over a larger range of strain or deformation of the palatal expander 100 over a completely rigid device, thereby allowing the palatal expander 100 to reduce the peak force applied to the palate, maxilla, and or teeth and more comfortably expand the maxilla by a set and/or predetermined amount, such as about 0.1 to 2.0 mm/day of expansion, or about 0.2 to 1.0 mm/day of expansion, or about 0.2 to mm/day of expansion. The elasticity and compliance of the liner can be adjusted to modulate the force applied to the anchors. Increasing the elasticity or compliance results in less force applied to the anchors, and decreasing the elasticity or compliance results in more force applied to the anchors. To accommodate the desired amount of expansion, the thickness of the liner 112 can be based on the amount of the desired amount of expansion, such as the thickness being about half the desired amount expansion plus an optional amount of buffer, such as about 0.2 to 0.6, 0.7, 0.8, 0.9, 1.0, 1.1, 1.2, 1.3, 1.4, 1.5, 1.6, 1.7, 1.8, 1.9 or 2.0 mm. The flexible, elastic and/or compressible liner 112 also makes it easier to insert the anchor into the anchor interfaces 110 and also improve the grip of the anchor interface 110 to the anchor. In some embodiments, the anchors can be made of a semi-elastic material instead of or in addition to the palatal expander.

To determine the implantation sites for the anchors in the patient's palate and to match the locations of the anchor interfaces 110 of the palatal expander 100 to the implantation sites, a template can be used. The template can be formed from a manual or digital impression of the patient's palate and teeth and can be sized and shaped similarly to the incremental palatal expanders. However, instead of having anchor interfaces, the template can have a plurality of anchor guides, which can simply be holes in the template, for guiding implantation of the anchors into the patient's palate and maxilla. The anchor guide locations can be customized to the patient to optimize the locations of the anchors in the maxilla. Once the anchor guide locations are determined on the template, the anchor interfaces 110 of the incremental palatal expanders 100 can be positioned to correspond to the anchor locations and orientation in the patient's maxilla and palate.

Alternatively, in some embodiments, the anchors are first inserted into the palate, and then an impression of the palate with embedded anchors is taken. This impression will have the location of the anchors and can be used to design and fabricate the palatal expander.

Figure 3A:
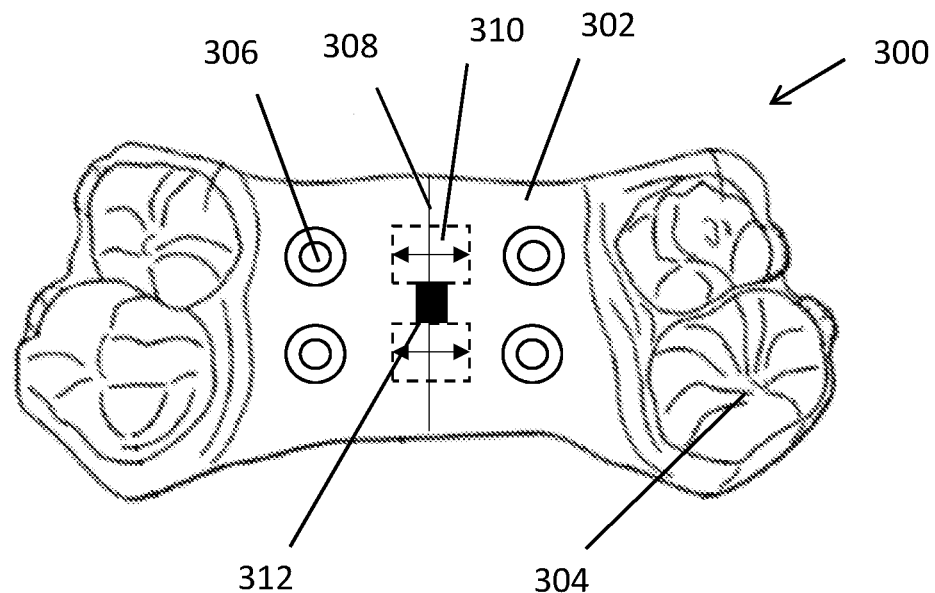
FIGS. 3A and 3B illustrate various embodiments of palatal expanders as described herein.

FIG. 3A illustrates an alternative embodiment of a palatal expander that is similar to the palatal expander shown in FIGS. 1A-1C. The palatal expander 300 can have a palatal region 302 that is flanked by teeth regions 304. A plurality of anchor interfaces 306 can be positioned on both sides of the palatal region 302. However, in this embodiment, the palatal region 302 can include a split 308 that divides the palatal region 302 into two halves. Sliding features 310 and a screw type expansion mechanism 312 can be included to allow the palatal region 302 to be expanded by turning the screw. Because this palatal expander 300 can be expanded, it may partially or completely replace the series of palatal expanders. In addition, the palatal expander 300 can be optionally provided with one or more spring features that can provide additional control over the amount of force applied to the maxilla and palate. The spring features can be embedded in the palatal region and/or incorporated into the expansion mechanism.

Figure 3B:
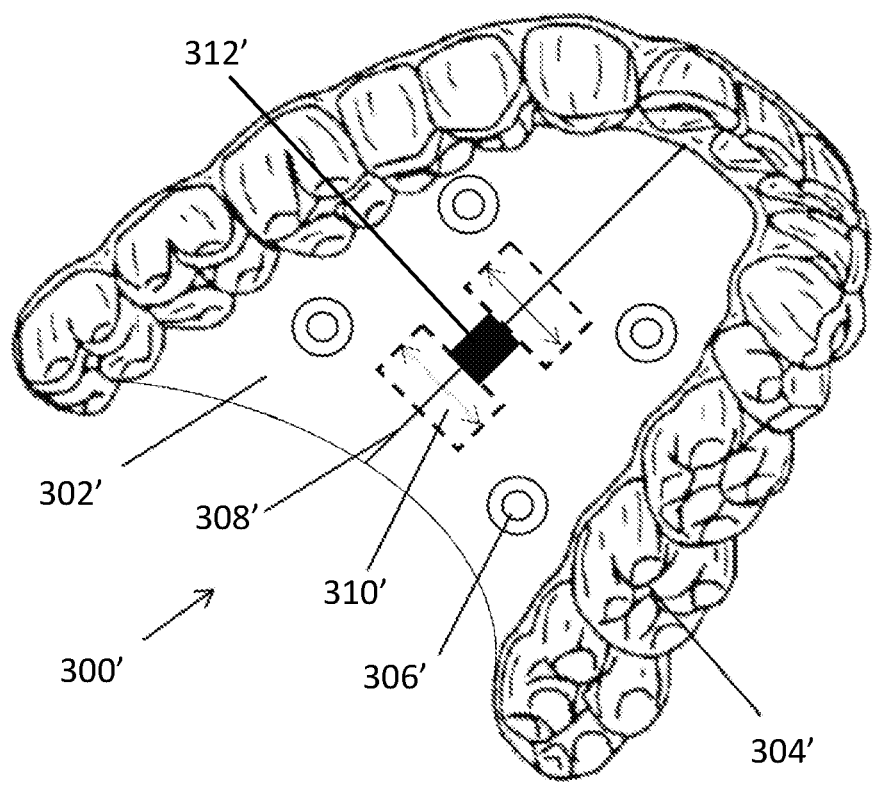

FIG. 3B illustrates another embodiment of a palatal expander that is similar to the palatal expander shown in FIG. 3A. In this embodiment, the palatal expander 300' can include a full aligner 304' that covers all the teeth in the upper jaw and a palatal region 302' that covers the palate. Using a full aligner that covers all the teeth allows control of the movement of all the teeth during the procedure to expand the palate. For example, this may allow the increased spacing between the teeth to be distributed more evenly between the teeth instead of being concentrated between the teeth straddling the midline of the palate. A plurality of anchor interfaces 306' can be positioned on both sides of the palatal region 302'. The palatal region 302' can include a split 308' that divides the palatal region 302' into two halves. Sliding features 310' and a screw type expansion mechanism 312' can be included to allow the palatal region 302' to be expanded by turning the screw. Because this palatal expander 300' can be expanded, it may partially or completely replace the series of palatal expanders. In addition, the palatal expander 300' can be optionally provided with one or more spring features that can provide additional control over the amount of force applied to the maxilla and palate. The spring features can be embedded in the palatal region and/or incorporated into the expansion mechanism.

The teeth receiving portions of both the full aligner and the partial aligner embodiments of the palatal expander can be used to progressively move teeth. In addition, the anchors can also be used as resistance points to help control the tooth movement, including generating upwards or downwards resistance force, for example, to allow extrusion or intrusion of the teeth.

The procedure for expanding the patient's palate can begin with obtaining a manual or digital impression of the patient's palate. The implantation sites for the anchors can be determined based on the patient's anatomy and the desired dispersal of forces to the maxilla. For example, at least one anchor site can be chosen for each side of the maxilla. Using additional anchors improves the stability of the system and reduces the risk of failure that may be cause by focusing too much force onto a particular anchor. Therefore, in some embodiments, at least two, three, or four anchor sites are chosen for each side of the maxilla. A series of palatal expanders and an anchor template can be fabricated based on the impression of the patient's palate.

The anchors can be implanted into opposing lateral sides of the patient's palate and maxilla using the anchor template. The anchor interfaces of the series palatal expanders and the anchor guides of the anchor template are in alignment so that the palatal expanders can be placed over and secured to the anchors.

A first palatal expander from the series of palatal expanders can be placed adjacent the patient's palate and optionally, over at least some of the patient's teeth, such as the posterior teeth (molars and premolars). The anchors can be inserted into the anchor interfaces of the palatal expander. The anchors may compress an elastic interface within the anchor interfaces more than the palatal region is compressed or deformed. After a period of time has elapsed, the first palatal expander can be removed and replaced by the next incremental palatal expander from the series, where the next incremental palatal expander is wider than the first palatal expander. The period of time between replacements can be at least one, two, three, four, five, six, or seven days. Larger and larger palatal expanders are inserted until the desired amount of palatal expansion is achieved.

If an expandable palatal expander is used as illustrated in FIGS. 3A and 3B for example, the screw type expansion mechanism can be rotated periodically, such as every 1, 2, 3, 4, 5, 6, or 7 days, according to a prescribed schedule. If the expandable palatal expander reaches its maximum diameter before the desired expansion of the palate has been achieved, it can be replaced with a larger version.

In some embodiments, the palatal expander can include one or more shape memory alloy expansion elements that function to expand the device when heated to body temperature. For example, a shape memory alloy ribbon or wire can have a collapsed configuration (i.e., an "S" configuration) below body temperature and an expanded configuration (i.e. a straightened configuration) at body temperature. In some embodiments, this expansion element can be used to join the two halves of the expandable palatal expander together, and as the expansion element is heated, it can push the two halves apart.

Figure 4A:
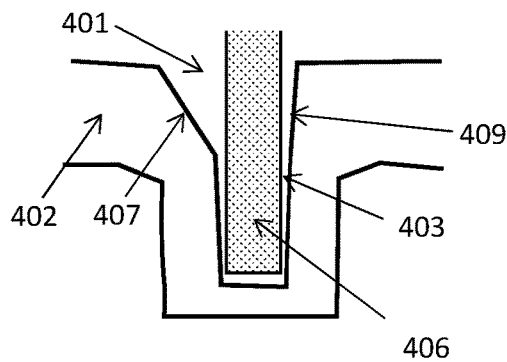
FIGS. 4A and 4B illustrate sectional views through examples of interfaces for temporary anchorage devices (TADs) as the anchor points in a palatal expander.

FIGS. 4A-4H illustrate examples of anchor interfaces that may be used with any of the apparatuses described herein, including the palatal expanders such as those shown in FIGS. 1A and 3. These figures show a simplified or schematic cross-section through an anchor interfaces or an exemplary apparatus such as a palatal expander. In FIG. 4A, the anchor interfaces is part of a palatal expander 402 and includes a distal opening 401 continuous with a proximal channel 403. An anchor 406 may be inserted into the anchor interface. In FIG. 4A, the anchor interfaces includes a sloped or beveled proximal opening 407, as discussed above. In this example, the circumferentially opposite side 409 of the opening is less sloped. For example, in a palatal expander, the side of the proximal opening into the anchor interface closes to the midline of the apparatus may include a ramp or slope (or more of a ramp or slope) compared to the opposite side, since the palatal expander may generally have an initially greater diameter than the patient's palate and inserting the anchor into the anchor interface may require force to bend or collapse the palatal expander slightly so that it will fit into the arch of the mouth, as described above.

In some embodiments, the palatal expander can be heated prior to insertion into the patient's mouth to make the palatal expander more pliable and flexible. This makes it easier to bend and manipulate the palatal expander when inserting the anchors into the anchor receiving portions. In some embodiments, the palatal expander can be heated to between 25 degrees C. and 43 degrees C. (e.g., heated to up to 37, 38, 39, 40, 41, or 42 degrees Celsius).

Figure 4B:
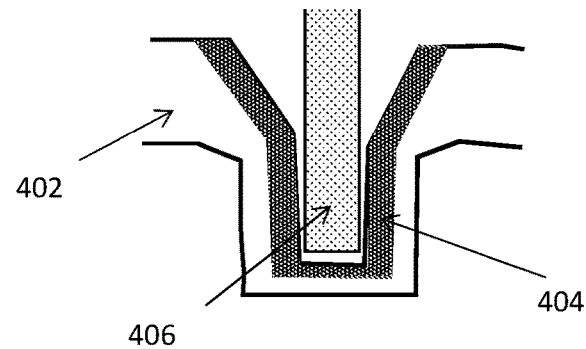

FIG. 4B shows an example of an anchor interface of a palatal expander in which an elastic interface 404 is included. This this example, the elastic interface is on a wall of the anchor interface, including both the proximal opening region as well as the distal channel. As will be described in greater detail below, the elastic interface may extend to only a portion of the anchor interface (e.g., only in the proximal opening, only in the distal channel portion of the anchor interface, etc.) and/or only partially around the anchor interface (e.g., against the side of the anchor interface that is closest to the midline of the device, the midline of the patient holding the apparatus.

Figure 4C:
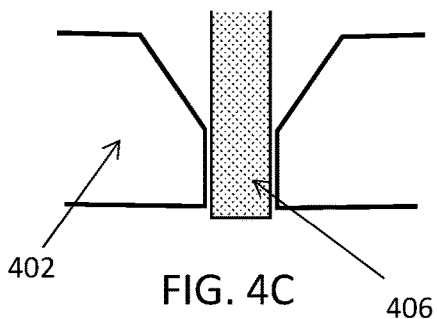
FIGS. 4C-4H illustrate examples of sections through an interface for temporary anchorage devices (TADs) as the anchor points in a palatal expander.
Figure 4D:
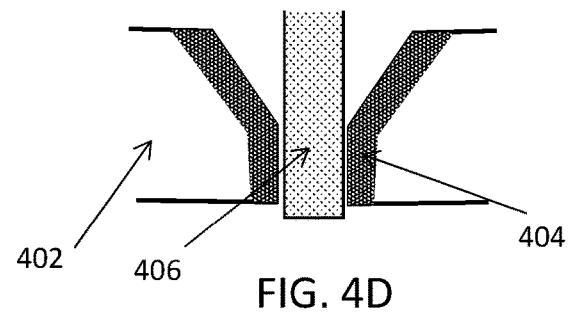
Figure 4E:
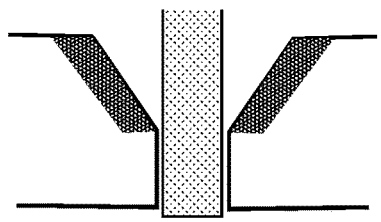
Figure 4F:
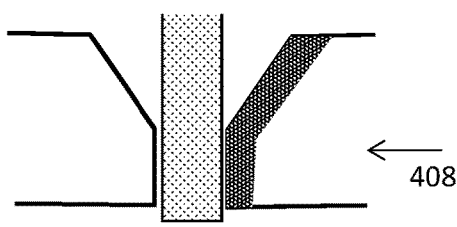
Figure 4G:
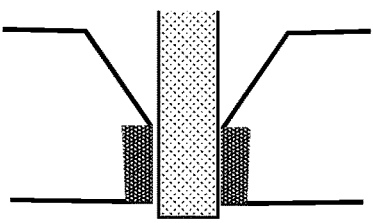
Figure 4H:
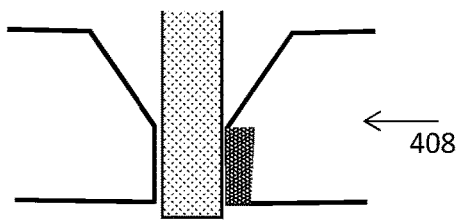

In the apparatuses shown in FIGS. 4A and 4B, the anchor interfaces do not extend completely through the apparatus. Alternatively, as shown in FIGS. 4C to 4H, the anchor interface may extend completely through the body of the apparatus (e.g., expander). In FIG. 4C, similar to that shown in FIG. 4A, the proximal opening is sloped. In this example, the proximal opening is sloped around its entire circumference, although it may only be sloped on the side against which the anchor will be pushed when the apparatus is worn (e.g., in most instances, the side closest to the midline of the apparatus). FIG. 4D is similar to the variations shown in FIG. 4C, but also passes completely through the apparatus. FIG. 4E shows a variation in which the elastic interface is located on just the region forming the ramped proximal opening. In FIG. 4F, the elastic interface is positioned just on one side (only partially circumferentially around) the anchor interface. This side 408 may be the side from which the majority of force, e.g., expansion force, is applied to the anchor. The elastic interface may be preferentially located to interpose between the anchor and the anchor interface when the apparatus is worn. Similarly, FIG. 4G shows a variation in which the distal channel portion of the anchor interface, which is also open at the bottom of the apparatus, includes an elastic interface. Finally, FIG. 4H shows an example in which just the side of the distal channel portion facing the midline, which will push against the anchor when expanding the patient's palate, includes an elastic interface.

Figure 5:
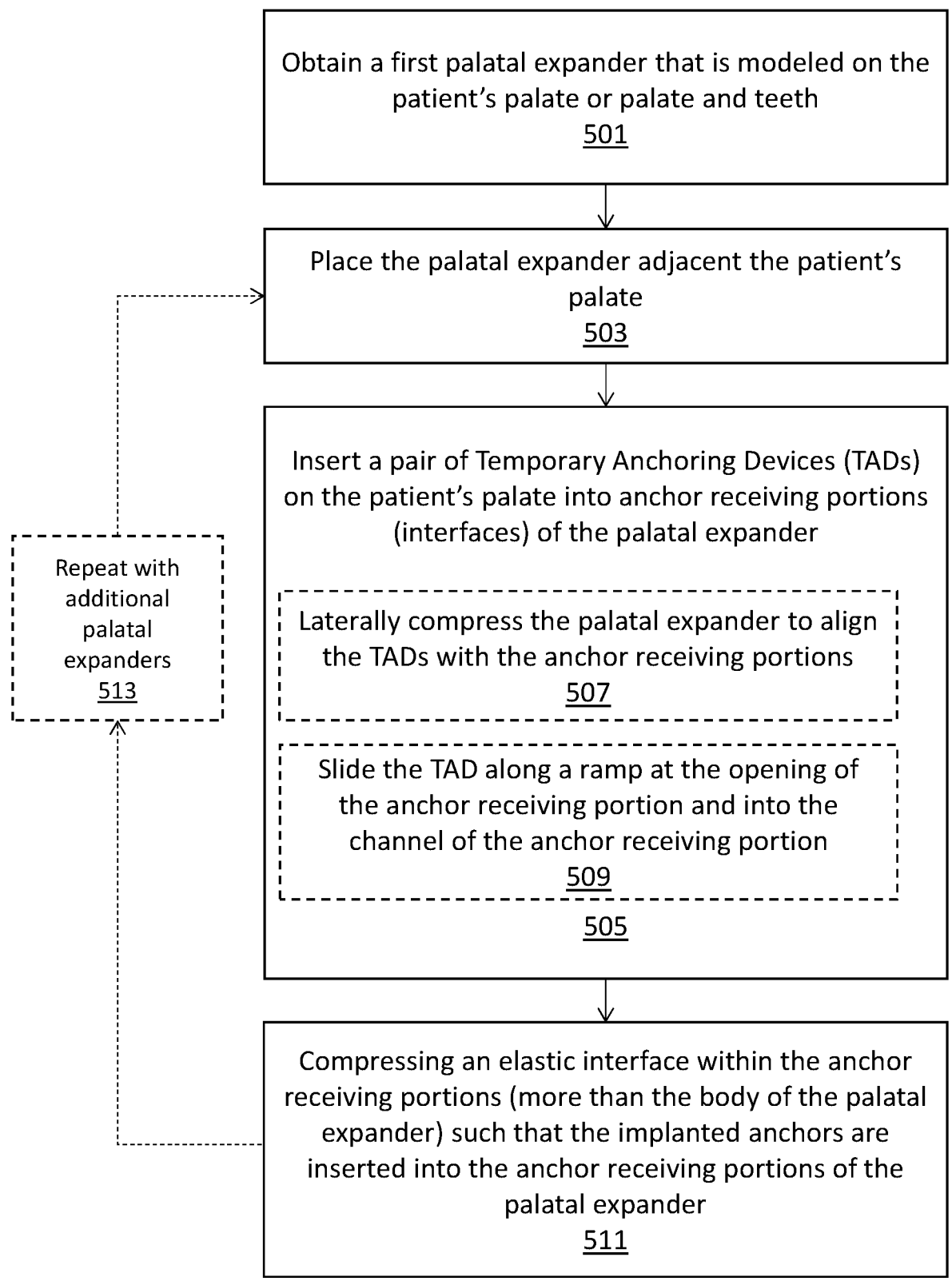
FIG. 5 illustrates one method of expanding a patient's palate using any of the apparatuses described herein including an elastic interface within an anchor interface in the apparatus.

Any of the apparatuses described herein may be used to expand a palate. These methods of use may further illustrate the advantages of these apparatuses, including For example, FIG. 5 schematically illustrates one method of expanding a patient's palate. In this example, the person inserting the apparatus, which may be a medical/dental professional (doctor, technician, orthodontist, etc.) may first obtain a palatal expander (e.g., a first palatal expander) that is modeled on the patient's palate or palate and teeth 501. Thereafter, the palatal expander may be placed adjacent the patient's palate 503. This may be achieved by inserting it into the subject's mouth. Once inserted into the mouth, the apparatus may be secured by inserting a pair of anchors (e.g., implants or Temporary Anchoring Devices (TADs)) on the patient's palate into anchor interfaces (interfaces) of the palatal expander. This step may include laterally compressing the palatal expander to align the anchors with the anchor interfaces 507. This step may also include sliding the anchor along a ramp at the proximal opening of the anchor interface and into the channel of the anchor interface 509.

Any of these methods may also include compressing an elastic interface within the anchor interfaces (more than the body of the palatal expander) such that the implanted anchors are inserted into the anchor interfaces of the palatal expander 511.

Figure 6:
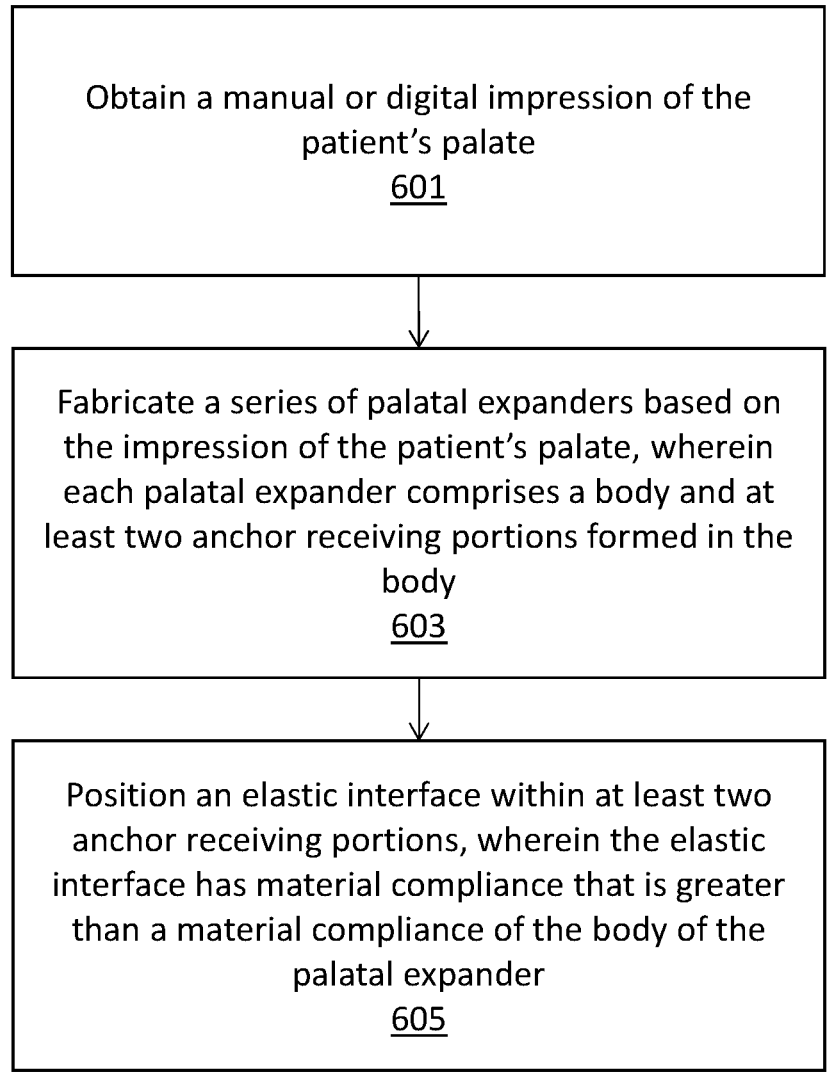
FIG. 6 illustrates one method of forming an apparatus including an anchor interface having an elastic interface, as described herein.

Finally, also described herein are method of forming or fabricating an apparatus including an anchor interface as described. For example, FIG. 6 provides a schematic overview of a method for forming an apparatus including an anchor interfaces and an elastic interface within the anchor interfaces. For example, a method of forming a series of palatal expanders for expanding a patient's palate may include: obtaining a manual or digital impression of the patient's palate 601; fabricating a series of palatal expanders based on the impression of the patient's palate, wherein each palatal expander comprises a body and at least two anchor interfaces formed in the body 603; and including an elastic interface within at least two anchor interfaces, wherein the elastic interface has material compliance that is greater than a material compliance of the body of the palatal expander 605. The elastic interface may be formed with the fabrication of the palatal expander, and/or added (e.g., as a coating, insert, etc.) after the rest of the palatal expander has been formed.

Device Fabrication

The design and fabrication process of the custom features specific for each patient provides dynamic flexibility to change the feature locations, sizes and shapes at specified stages in the treatment. For example, the process allows (1) shifting/moving the anchorage location during treatment to reduce the time that soft tissue is in contact with the aligner/palatal expander to minimize irritation; and/or (2) changing the anchorage location, shape and/or size to adjust (in terms of force or pressure) to changes in the arch during treatment. Suitable fabrication processes include additive manufacturing process, one piece thermoform, one piece direct print fabrication, two piece snap-in lock, two piece sonic weld, and two piece adhesive bond.

Figure 7:
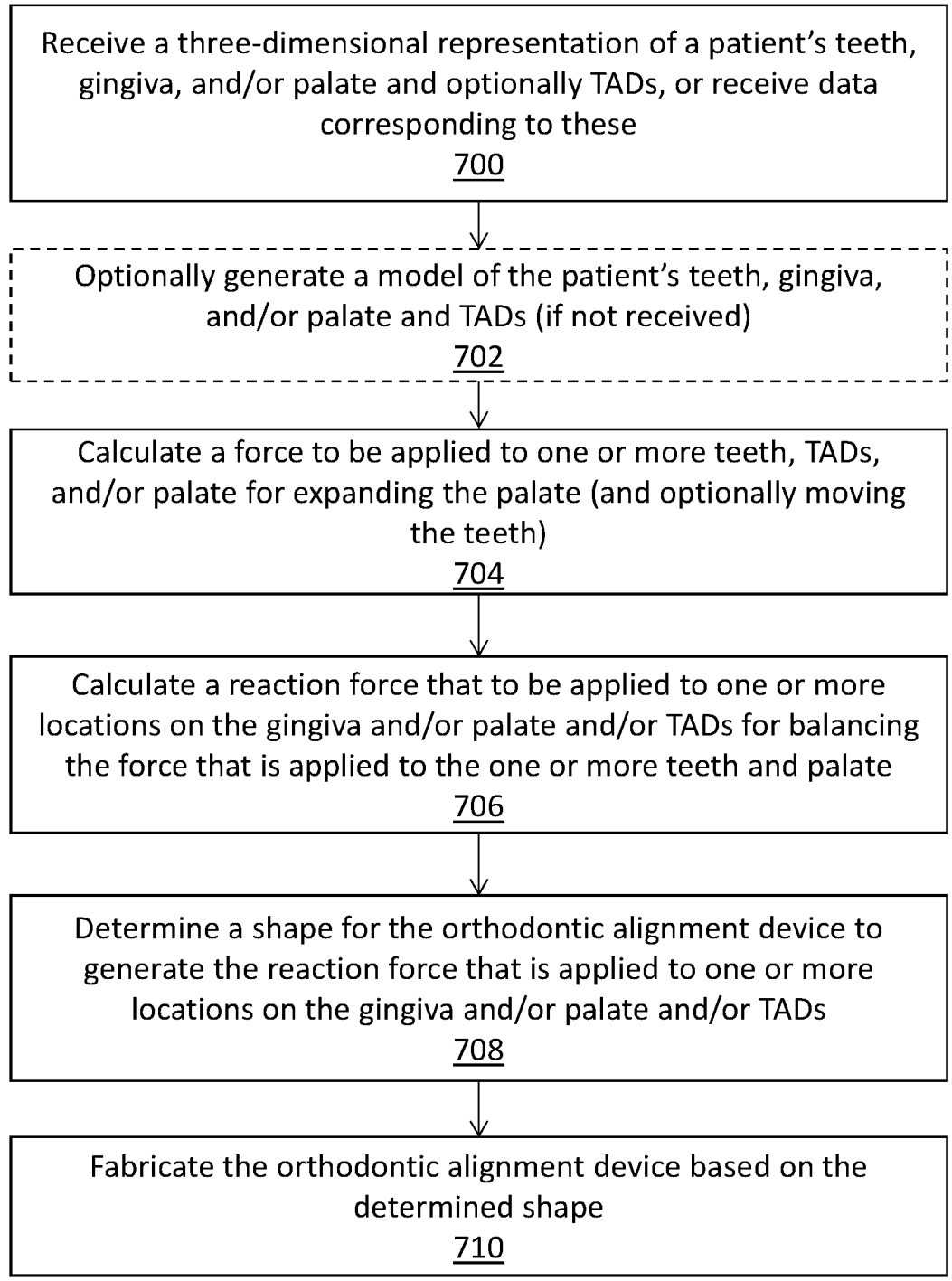
FIG. 7 is a flow chart that illustrates a computer implemented method for fabricating a dental appliance.

FIG. 7 is a flow chart that illustrates a computer implemented method for fabricating a dental appliance. The method can be implemented on a computer having a processor, memory, and software that is programmed to implement the following steps. In step 700, the method may include receiving (or optionally 702 forming) a three-dimensional representation of a patient's teeth, gingiva, and/or palate of a patient's mouth. As mentioned above, in some embodiments the anchors can be implanted before imaging, while in other embodiments, the anchors are implanted after imaging. The anchors can be TADs, regular implants, or a combination of the two. In some variations the 3D digital model of the patient's upper arch (e.g., including palate, teeth and/or gingiva) may be received and manipulated, including adding or calculating the positions of two or more anchors. In some variations, the locations of two or more pre-implanted anchors within the patient's mouth, may be added to the 3D model. For example, in step 704, the force that is applied to the palate, anchors and/or teeth for separating the palate (and/or optionally for moving the teeth in a desired direction and amount) may be calculated from the 3D digital model. In addition, the force applied to the anchors, teeth, and/or palate, or any sub-combination of these features, to expand the palate in a desired amount, may be calculated. In step 706, the reaction force that may be applied to one or more locations on the anchors and/or palate, teeth and/or gingiva for balancing the force applied to the one or more teeth may be calculated. In step 708, the shape for the orthodontic alignment device may be determined based on the model of the patient's teeth, palate, and/or gingiva, the calculated force that is applied to the teeth, and the calculated reaction force that is applied to one or more locations on the teeth, palate and/or gingiva, and/or anchors. In step 710, the orthodontic alignment device (e.g., palatal expander) may be fabricated based on the determined shape. Forces may be determined using a computational model of the aligner based on FEA, for example, or according to the methods described in U.S. Pat. No. 9,375,300, which is hereby incorporated by reference in its entirety.

Figure 8:
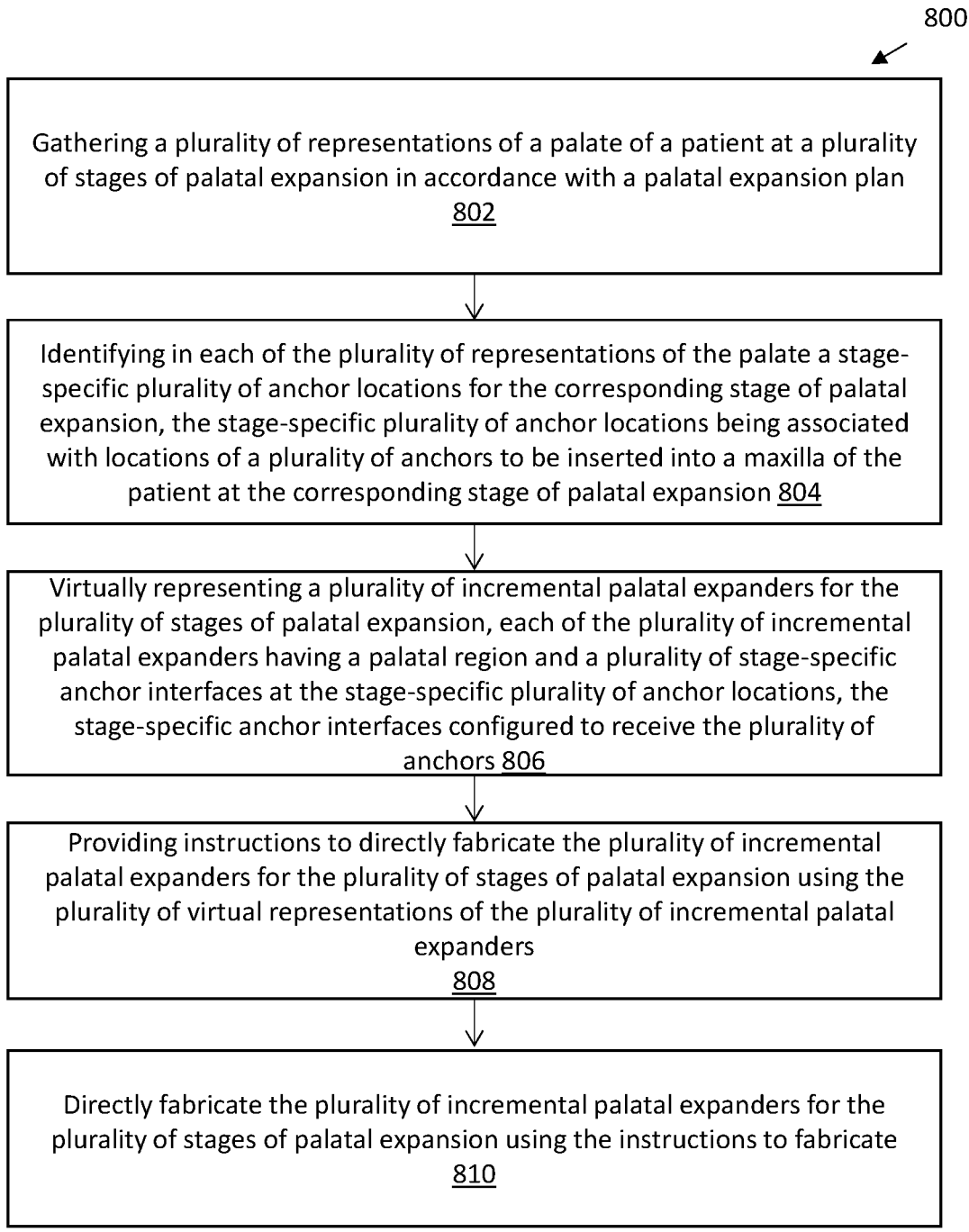
FIG. 8 is a flow chart that illustrates an example of a computer-implemented method for designing and/or fabricating a plurality of incremental palatal expanders.

FIG. 8 is a flow chart that illustrates an example of a computer-implemented method 800 for designing and/or fabricating a plurality of incremental palatal expanders. Implementations may include more or less operations than those explicitly shown. The method 800 may be executed by a computer processor and/or in conjunction with instructions stored on computer memory.

At an operation 802, a plurality of representations of a palate of a patient at a plurality of stages of palatal expansion may be gathered in accordance with a palatal expansion plan. The patient's dentition may be captured through manual impressions and/or digitally scanned. Analog impressions may themselves be scanned into a digital format. The patient's dentition may contain a representation of the patient's palate before undergoing treatment. Using orthodontic treatment and/or palatal expansion software, various stages of palatal expansion may be determined. A "stage" of palatal expansion, as used herein, may include a state of a patient' palate during palatal expansion, and may include a beginning/initial stage before treatment, intermediate stages during the course of treatment, and an end/final stage after treatment. Stages of palatal expansion may correspond to different sizes of the palate as it expands through a palatal expansion plan.

At an operation 804, a stage-specific plurality of anchor locations in each of the plurality of representations of the palate for the corresponding stage of palatal expansion may be identified. The stage-specific plurality of anchor locations may be associated with locations of a plurality of anchors to be inserted into a maxilla of the patient at a corresponding stage of palatal expansion. As an example, pairs of anchors may be inserted into a patient's maxilla at the outset of a treatment plan. The anchors in each pair may be substantially equidistant and/or symmetrically arranged about a patient's midline. As the patient's palate expands through the course of treatment, the anchors in each pair may separate from one another and/or the patient's midline even though the anchors remain substantially stationary in the patient's maxilla through the course of the treatment plan. In such implementations, the likely locations of anchor locations of the anchors would be discerned for each stage of the palatal expansion plan. Such likely locations of the anchors at each stage of the palatal expansion may be identified.

At an operation 806, a plurality of incremental palatal expanders for the plurality of stages of palatal expansion may be virtually represented. Each of the incremental palatal expanders may provide an outward, lateral force that causes the maxilla and/or palate to expand. Each of the incremental palatal expanders may provide an outward, lateral force that causes the patient to move from one stage of palatal expansion to a subsequent stage of palatal expansion. Each of the incremental palatal expanders may have a palatal region that can mate with the patient's palate at the corresponding stage of palatal expansion. The palatal region may include a rigid material that provides an outward, lateral forces. The plurality of incremental palatal expanders may each have a plurality of stage-specific anchor interfaces at or approximately at the stage-specific plurality of anchor locations. The stage-specific anchor interfaces may be configured with a size, shape, and/or material that receives the plurality of anchors at the specific stage of palatal expansion. As noted herein, the plurality of stage-specific anchor interfaces may be configured to direct at least a portion of the outward, lateral force to the maxilla through the plurality of anchors. In various implementations, the stage-specific plurality of anchor locations comprise one or more pairs of anchor locations, the anchor locations in each pair having a substantially equidistant distance from a midline of the palate. Additionally, in various implementations, the substantially equidistant distance of the each pair of anchor locations at an earlier stage of palatal expansion of the plurality of stages of palatal expansion may be smaller than the substantially equidistant distance of the each pair of anchor locations at a later stage of palatal expansion of the plurality of stages of palatal expansion.

At an operation 808, instructions to directly fabricate the plurality of incremental palatal expanders for the plurality of stages of palatal expansion using the plurality of virtual representations of the plurality of incremental palatal expanders may be provided. At an operation 810, the plurality of incremental palatal expanders for the plurality of stages of palatal expansion may be directly fabricated using the fabrication instructions.

Additional Considerations

When a feature or element is herein referred to as being "on" another feature or element, it can be directly on the other feature or element or intervening features and/or elements may also be present. In contrast, when a feature or element is referred to as being "directly on" another feature or element, there are no intervening features or elements present. It will also be understood that, when a feature or element is referred to as being "connected", "attached" or "coupled" to another feature or element, it can be directly connected, attached or coupled to the other feature or element or intervening features or elements may be present. In contrast, when a feature or element is referred to as being "directly connected", "directly attached" or "directly coupled" to another feature or element, there are no intervening features or elements present. Although described or shown with respect to one embodiment, the features and elements so described or shown can apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments only and is not intended to be limiting of the invention. For example, as used herein, the singular forms "a", "an" and "the" are intended to include the plural forms as well, unless the context clearly indicates otherwise. It will be further understood that the terms "comprises" and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items and may be abbreviated as "/". Gathering may include, for example, collecting, fabrication, ordering, receiving, sequencing, assembling, and organizing.

Spatially relative terms, such as "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features. Thus, the exemplary term "under" can encompass both an orientation of over and under. The device may be otherwise oriented (rotated 90 degrees or at other orientations) and the spatially relative descriptors used herein interpreted accordingly. Similarly, the terms "upwardly", "downwardly", "vertical", "horizontal" and the like are used herein for the purpose of explanation only unless specifically indicated otherwise.

Although the terms "first" and "second" may be used herein to describe various features/elements (including steps), these features/elements should not be limited by these terms, unless the context indicates otherwise. These terms may be used to distinguish one feature/element from another feature/element. Thus, a first feature/element discussed below could be termed a second feature/element, and similarly, a second feature/element discussed below could be termed a first feature/element without departing from the teachings of the present invention.

Throughout this specification and the claims which follow, unless the context requires otherwise, the word "comprise", and variations such as "comprises" and "comprising" means various components can be co-jointly employed in the methods and articles (e.g., compositions and apparatuses including device and methods). For example, the term "comprising" will be understood to imply the inclusion of any stated elements or steps but not the exclusion of any other elements or steps.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise. For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, represents endpoints and starting points, and ranges for any combination of the data points. For example, if a particular data point "10" and a particular data point "15" are disclosed, it is understood that greater than, greater than or equal to, less than, less than or equal to, and equal to 10 and 15 are considered disclosed as well as between 10 and 15. It is also understood that each unit between two particular units are also disclosed. For example, if 10 and 15 are disclosed, then 11, 12, 13, and 14 are also disclosed.

Although various illustrative embodiments are described above, any of a number of changes may be made to various embodiments without departing from the scope of the invention as described by the claims. For example, the order in which various described method steps are performed may often be changed in alternative embodiments, and in other alternative embodiments one or more method steps may be skipped altogether. Optional features of various device and system embodiments may be included in some embodiments and not in others. Therefore, the foregoing description is provided primarily for exemplary purposes and should not be interpreted to limit the scope of the invention as it is set forth in the claims.

The examples and illustrations included herein show, by way of illustration and not of limitation, specific embodiments in which the subject matter may be practiced. As mentioned, other embodiments may be utilized and derived there from, such that structural and logical substitutions and changes may be made without departing from the scope of this disclosure. Such embodiments of the inventive subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A system for expanding a patient's palate through a plurality of incremental stages of a palatal expansion plan, the system comprising:
    a plurality of palatal expanders, each palatal expander of the plurality of palatal expanders having a different shape and size for expanding the patient's palate according to a different incremental stage of the palatal expansion plan, each palatal expander comprising:
        a palatal region corresponding to the patient's palate at one incremental stage of the plurality of incremental stages of the palatal expansion plan, and configured to exert an outward, lateral force on the patient's palate according to the one incremental stage of the palatal expansion plan, the palatal region having a first rigidity;
        one or more anchor interfaces configured to receive a corresponding one or more anchors extending from the patient's maxilla, the one or more anchor interfaces configured to direct at least a portion of the outward, lateral force to the patient's maxilla through the one or more anchors to facilitate skeletal expansion of the patient's maxilla during the one incremental stage of the palatal expansion plan; and
        one or more soft portions having a second rigidity less than the first rigidity of the palatal region, wherein the second rigidity facilitates gripping of the one or more anchors by the one or more soft portions when the one or more anchors are received within the one or more anchor interfaces.

2. The system of claim 1, wherein the one or more soft portions has a higher compliance than the palatal region.

3. The system of claim 1, wherein the one or more anchor interfaces includes one or more openings, and wherein the one or more soft portions reside within the one or more openings.

4. The system of claim 1, wherein the one or more anchor interfaces are formed within the palatal region.

5. The system of claim 1, wherein the palatal region is shaped to provide a gap between the palatal region and the patient's palate.

6. A palatal expander of a series of palatal expanders for expanding a patient's palate according to a plurality of incremental stages of a palatal expansion plan, the palatal expander comprising:
    a palatal region corresponding to the patient's palate at one incremental stage of the plurality of incremental stages of the palatal expansion plan, and configured to exert an outward, lateral force to expand the patient's palate according to the one incremental stage of the palatal expansion plan, the palatal region having a first rigidity;

one or more teeth receiving portions coupled to the palatal region, the one or more teeth receiving portions having a shape and size to receive at least a portion of the patient's teeth;

one or more anchor interfaces configured to receive a corresponding one or more anchors extending from the patient's maxilla, the one or more anchor interfaces configured to direct at least a portion of the outward, lateral force to the patient's maxilla through the one or more anchors to facilitate skeletal expansion of the patient's maxilla according to the one incremental stage of the palatal expansion plan; and one or more soft portions having a second rigidity less than the first rigidity of the palatal region, wherein the second rigidity facilitates gripping of the one or more anchors by the one or more soft portions when the one or more anchors are received within the one or more anchor interfaces.

7. The palatal expander of claim 6, wherein the one or more anchor interfaces include one or more openings, and wherein the one or more soft portions reside within the one or more openings.

8. The palatal expander of claim 6, wherein the one or more anchor interfaces are formed within the palatal region.

9. The palatal expander of claim 6, wherein the one or more anchor interfaces includes one or more openings, wherein the one or more openings is beveled at a beveled region.

10. The palatal expander of claim 9, wherein the one or more soft portions is located at least at the beveled region of the one or more openings.

11. The palatal expander of claim 6, wherein the one or more teeth receiving portions is configured to be placed over one or more of: a lingual surface of the patient's teeth, an occlusal surface of the patient's teeth, and a buccal surface of the patient's teeth.

12. The palatal expander of claim 6, wherein the one or more anchor interfaces are located on opposing lateral sides of the palatal region.

13. The palatal expander of claim 6, wherein the palatal expander is configured to sufficiently bend to fit the palatal expander into the patient's dental arch.

14. The palatal expander of claim 6, wherein the palatal expander includes two or more anchor interfaces.

15. The palatal expander of claim 6, wherein the one or more anchor interfaces have a cross-sectional profile having one or more of a round, an elliptical and a polygonal shape.

16. The palatal expander of claim 6, wherein the one or more soft portions has a higher compliance than the palatal region.

17. A method of expanding a patient's palate, the method comprising:

placing a palatal expander into the patient's dental arch, wherein the palatal expander is one of a series of palatal expanders for expanding the patient's palate according to a plurality of incremental stages of a palatal expansion plan, wherein the palatal expander has a palatal region that exerts an outward, lateral force to expand the patient's palate according to one incremental stage of the palatal expansion plan, wherein the palatal expander has a first rigidity;

wherein placing the palatal expander comprises receiving one or more of the patient's teeth in one or more teeth receiving portions of the palatal expander, and positioning one or more anchors extending from the patient's maxilla into corresponding one or more anchor interfaces of the palatal expander, wherein the one or more anchor interfaces direct at least a portion of the outward, lateral force to the patient's maxilla through the one or more anchors to facilitate skeletal expansion of the patient's maxilla according to the one incremental stage of the palatal expansion plan; and wherein one or more soft portions of the palatal expander has a second rigidity less than the first rigidity of the palatal region, wherein the second rigidity facilitates gripping of the one or more anchors by the one or more soft portions.

18. The method of claim 17, wherein placing the palatal expander comprises placing the palatal region against the patient's palate when the one or more anchors are positioned within the corresponding one or more anchor interfaces.

19. The method of claim 17, wherein placing the palatal expander comprises providing a space between the palatal region from the patient's palate when the one or more anchors are positioned within the corresponding one or more anchor interfaces.

20. The method of claim 17, wherein the one or more anchor interfaces include one or more openings, and wherein the one or more soft portions reside within the one or more openings, and wherein placing the palatal expander comprises positioning the one or more anchors within the one or more openings.

21. The method of claim 17, wherein the one or more anchor interfaces are formed within the palatal region, and wherein the one or more anchor interfaces are located on opposing lateral sides of the palatal region.

* * * * *